United States Patent [19]
Sato

[11] Patent Number: 5,296,877
[45] Date of Patent: Mar. 22, 1994

[54] MULTICOLOR IMAGE FORMING METHOD AND APPARATUS THEREFOR

[75] Inventor: Masumi Sato, Yokohama, Japan

[73] Assignee: Ricoh Company, Ltd., Tokyo, Japan

[21] Appl. No.: 900,500

[22] Filed: Jun. 18, 1992

[30] Foreign Application Priority Data

Jun. 18, 1991 [JP] Japan .................. 3-146060

[51] Int. Cl.$^5$ ............................. G03G 15/01
[52] U.S. Cl. ..................... 346/157; 358/500; 430/42
[58] Field of Search ............... 346/157, 160; 358/298, 358/300, 75, 80; 430/42, 43, 44

[56] References Cited

U.S. PATENT DOCUMENTS 4,814,797  3/1989  Haneda et al. ............. 346/157
5,128,699  7/1992  Nakajima et al. ........... 346/160

*Primary Examiner*—Joan H. Pendegrass
*Attorney, Agent, or Firm*—Oblon, Spivak, McClelland, Maier & Neustadt

[57] ABSTRACT

A method of forming a multicolor image and an apparatus therefor capable of reducing the deviation between successive toner images of different colors and enhancing dot reproducibility. In the event of the second and successive sequences of steps included in a single multicolor image forming process, the intensity of a laser beam is controlled together with a beam diameter or an emission pulse width such that, when the laser beam scans part of the photoconductive element where a toner image formed by the preceding sequence of steps is present, the laser beam forms a dot of substantially the same size in both the part where a toner image is present and part where a toner image is absent, in matching relation to the interception and scattering characteristics of the laser beam due to the toner image.

4 Claims, 11 Drawing Sheets

Fig. 6

| DUTY (%) | EXPOSURE BARE AREA (0.7mW) | | EXPOSURE TO AREA WITH TONER (1.0mW) | | |
|---|---|---|---|---|---|
| | DIAMETER (MAIN SCAN) | DIAMETER (SUB SCAN) | DUTY (%) | DIAMETER (MAIN SCAN) | DIAMETER (SUB SCAN) |
| 15 | 30.5 | 40.0 | 50 | 30.4 | 38.6 |
| 20 | 40.9 | 53.1 | 56 | 41.8 | 52.3 |
| 25 | 47.8 | 61.5 | 61 | 48.8 | 60.5 |
| 30 | 53.2 | 67.5 | 66 | 54.7 | 67.0 |
| 35 | 57.7 | 72.1 | 70 | 58.9 | 71.5 |
| 40 | 61.7 | 75.8 | 74 | 62.7 | 75.3 |
| 45 | 65.4 | 78.8 | 78 | 66.2 | 78.7 |
| 50 | 68.8 | 81.1 | 81 | 68.8 | 81.0 |

Fig. 11A
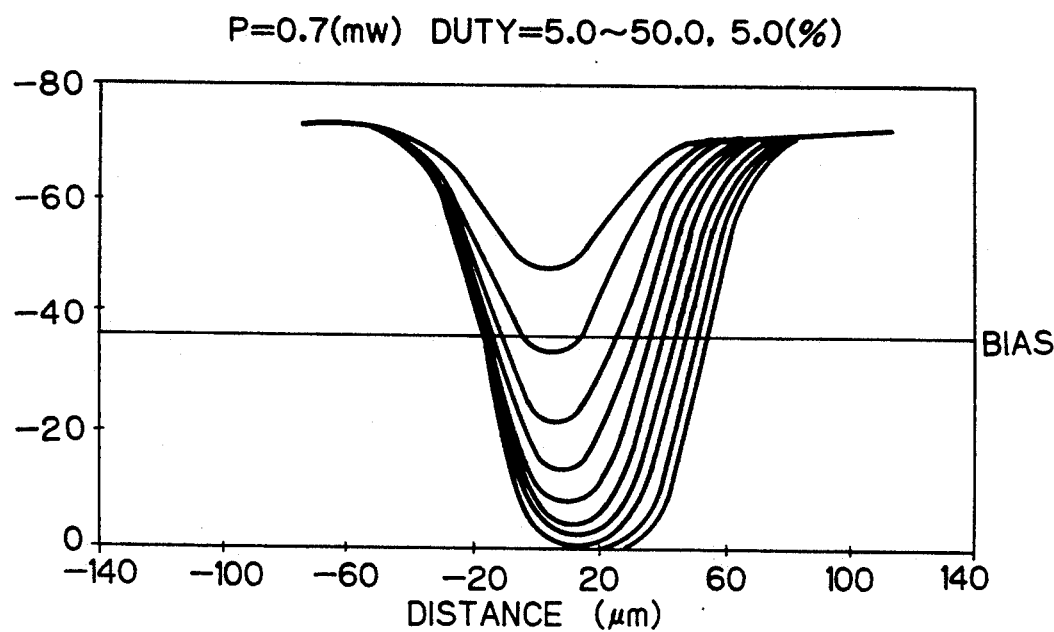
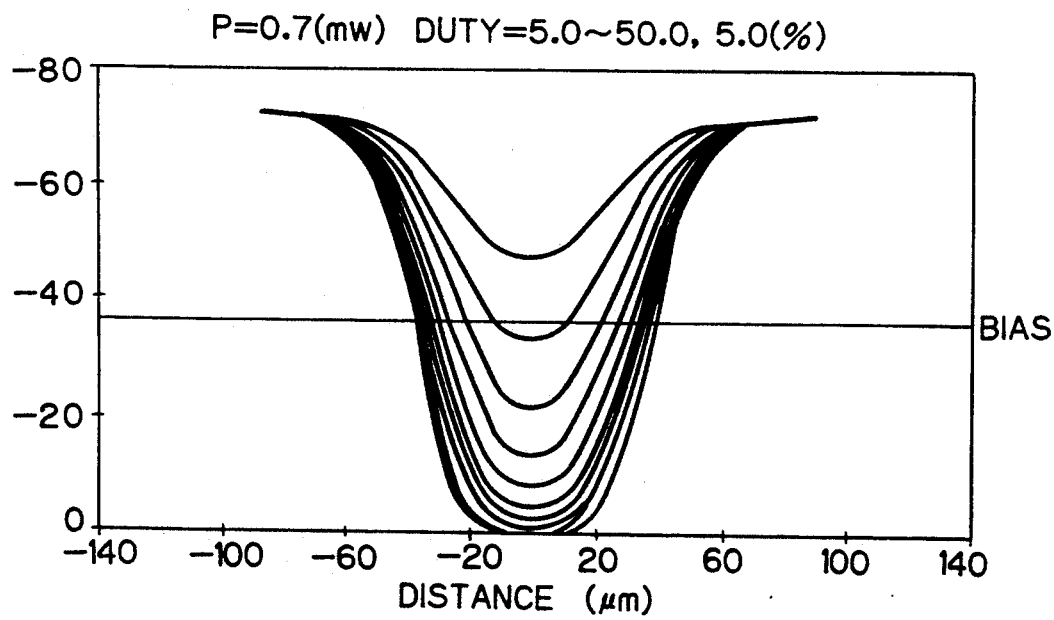
Fig. 11B

Fig. 11C
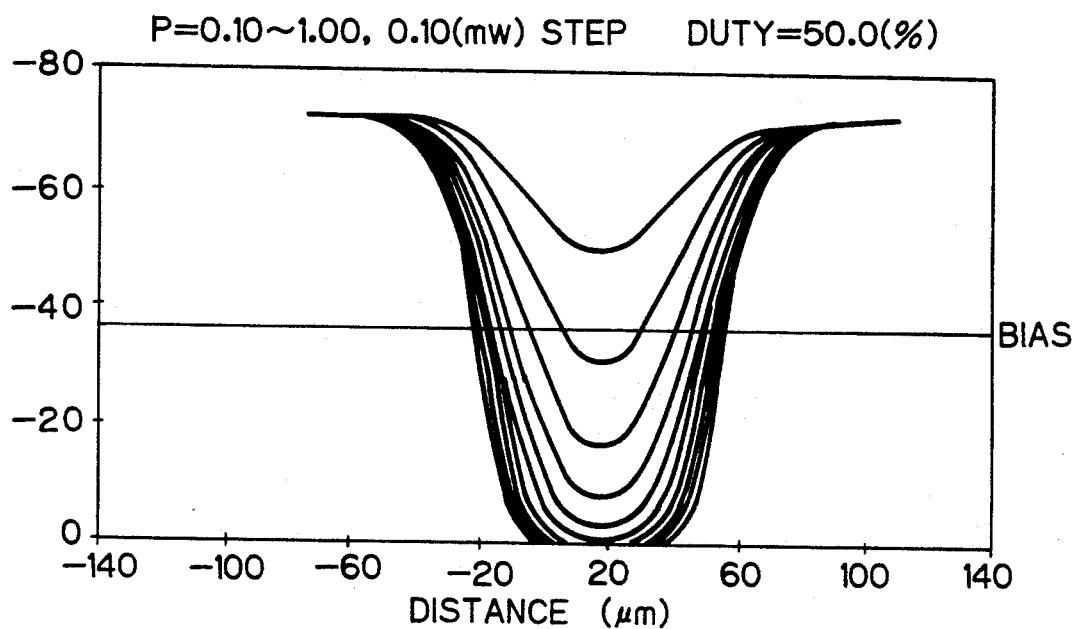
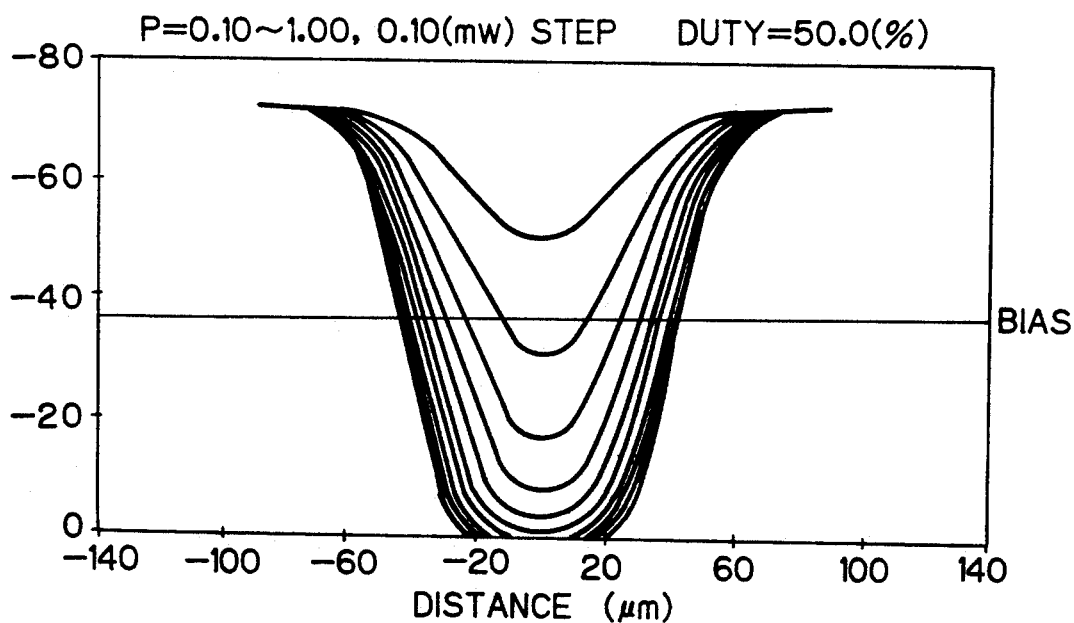
Fig. 11D

MULTICOLOR IMAGE FORMING METHOD AND APPARATUS THEREFOR

BACKGROUND OF THE INVENTION

The present invention relates to a method of forming a multicolor image and an apparatus therefor.

It has been customary in the imaging art to uniformly charge a photoconductive element, scan the photoconductive element to electrostatically form a latent image thereon, and developing the latent image by reversal to thereby form a toner image. To form a multicolor image, such a sequence is repeated with each of a plurality of toners of different colors to produce a multicolor toner image on the photoconductive element, an then the toner image is transferred to a paper sheet or similar recording medium and fixed thereon. This kind of method is advantageous over another conventional method which transfers a toner image to a paper sheet every time the toner image is formed so as to superpose such toner images on the paper sheet, since it reduces the deviation between successive toner images of different colors and effects image transfer only once. However, the problem with the former scheme is that at the second and successive image forming steps included in the same multicolor image forming process, the laser beam scans the photoconductive element through a toner image or images existing on the element. Hence, a desirable multicolor image is not achievable unless the same scanning effect is set up in both the area where a toner image is present and the area where it is absent. To expose both the area where a toner image present and the area where it is absent to the same degree, the intensity of the laser beam may be increased in the former area, as proposed in Japanese Patent Laid-Open Publication No. 63225/1990. However, simply controlling the intensity of the laser beam is not successful in achieving satisfactory dot reproducibility in the area where toner images overlap, since the laser beam has its intensity reduced and its diameter changed when transmitted through the toner image.

SUMMARY OF THE INVENTION

It is therefore an object of the present invention to provide a new and useful multicolor image forming method which reduces the deviation between successive toner images of different colors and enhances dot reproducibility, and an apparatus therefor.

In accordance with the present invention, in a method of forming a multicolor image on a recording medium by repeating a sequence of steps of uniformly charging a photoconductive element, scanning the element by a laser beam to form an electrostatic latent image thereon, and developing the latent image by reversal with each of a plurality of toners of different colors to thereby produce a multicolor toner image on the element, and transferring the multicolor toner image to and fixing it on a recording medium, the intensity of the laser beam is controlled together with a beam diameter or an emission pulse width in the vent of the second and successive sequences of steps included in a single multicolor image forming process such that, when the laser beam scans part of the photoconductive element where a toner image formed by the preceding sequence of steps is present, the laser beam forms a dot of substantially the same size in both the part where a toner image is present and the part where a toner image is absent, in matching relation to the interception and scattering characteristic of the laser beam due to the toner image.

Also, in accordance with the present invention, an apparatus for forming a multicolor image on a recording medium by repeating a sequence of steps of uniformly charging a photoconductive element, scanning the element by a laser beam from a laser diode (LD) to form an electrostatic latent image on the element, and developing the latent image by reversal with each of a plurality of toners of different colors to thereby produce a multicolor toner image on the element, and transferring the multicolor toner image to and fixing it on a recording medium comprises an image data storage for storing image data representative of the toner images of different colors formed on the photoconductive element, a data converting circuit for determining, on receiving image data, the intensity and beam diameter of the laser beam on the basis of the contents of the image data storage, an LD driver for driving the LD in response to an output of the data converting circuit, and a beam diameter changing circuit for changing the diameter of the laser beam in response to an output of the data converting circuit. The data converting circuit determines, in the event of the second and successive sequences of steps included in a single multicolor image forming process, an emission intensity and a beam diameter of the LD such that, when the laser beam scans part of the photoconductive element where a toner image formed by the preceding sequence of steps is present, the laser beam forms a dot of substantially the same size in both the part where a toner image is present and the part where a toner image is absent, in matching relation to the interception and scattering characteristics of the laser beam due to the toner image.

Further, in accordance with the present invention, an apparatus of the type described comprises an image data storage for storing image data representative of the toner images of different colors formed on the photoconductive element, a data converting circuit for determining, on receiving image data, an intensity and an emission pulse width of the laser beam on the basis of the contents of the image data storing circuit, and an LD driver for driving the LD in response to an output of the data converting circuit. The data converting circuit determines, in the event of the second and successive sequences of steps included in a single multicolor image forming process, an emission intensity and an emission pulse width of the LD such that, when the laser beam scans part of the photoconductive element where a toner image formed by the preceding sequence of steps is present, the laser beam forms a dot of substantially the same size in both the part where a toner image is present and the part where a toner image is absent, in matching relation to the interception and scattering characteristics of the laser beam due to the toner image.

BRIEF DESCRIPTION OF THE DRAWINGS

The above and other objects, features and advantages of the present invention will become more apparent from the following detailed description taken with the accompanying drawings in which:

FIG. 6 is a table listing specific combinations of emission intensity and emission pulse width for forming dots of various sizes in part of a photoconductive element where a toner image is present and part where it is absent;

FIGS. 11A, 11B, 11C and 11D are graphs each showing the variation of potential distribution representative of one dot ascribable to a change in the emission intensity and emission pulse width of a laser diode.

DESCRIPTION OF THE PREFERRED EMBODIMENTS

Figure 7:
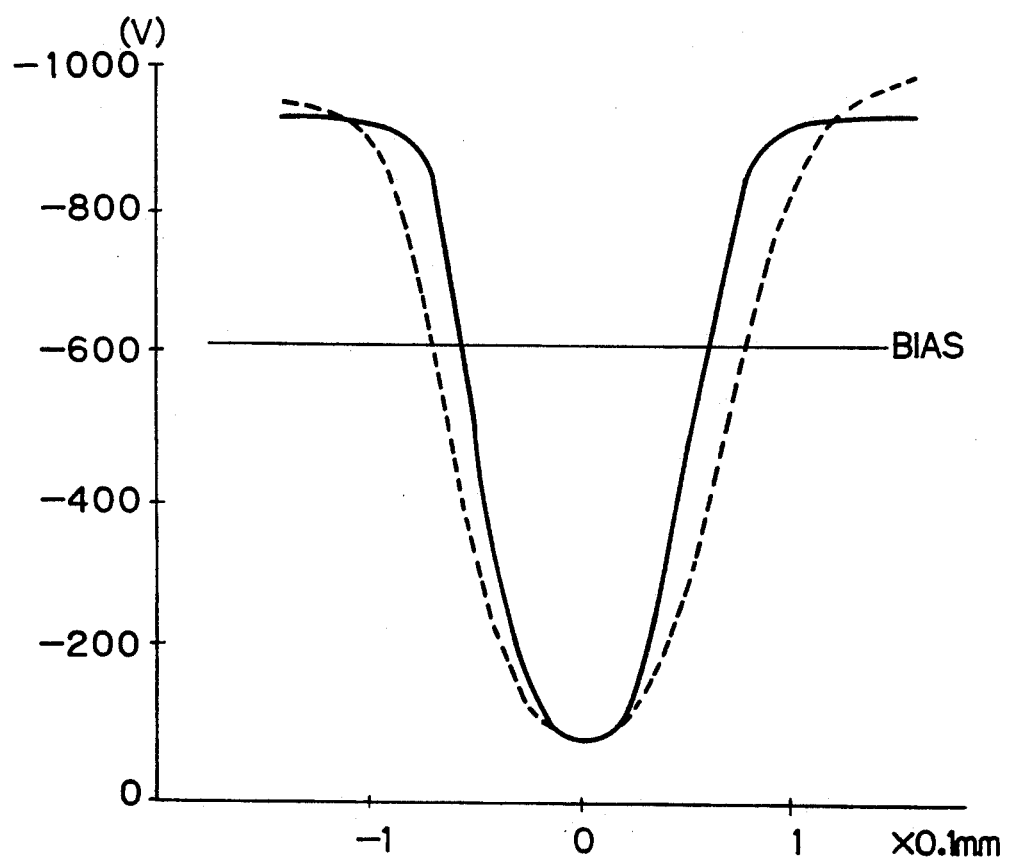
FIG. 7 is a graph indicating the extension of a dot produced by scanning effected through a toner layer.

To begin with, FIG. 7 indicates the surface potential of a photoconductive element on the ordinate and the position of the element on the abscissa. When the surface of the photoconductive element is uniformly charged to approximately −1000 V and then illuminated by a laser beam having a wavelength of 780 nm and a predetermined spot diameter over a predetermined period of time, the surface potential is distributed as indicated by a solid curve in the graph. The laser beam is emitted from a laser diode (LD) whose power is 0.45 mW. On the other hand, when the surface of a photoconductive element carrying a yellow toner thereon in a uniform distribution (0.75 mg per 1 cm$^2$) is illuminated by a laser beam with the above-mentioned spot diameter over the above-mentioned period of time and with LD power of 1.0 mW, the surface potential is distributed as indicated by a broken curve in FIG. 7. The greater LD power allows the potential distribution to have the same peak as with the smaller LD power despite that the illumination is effected through the yellow toner. However, the potential distribution has a greater width in the area where the yellow toner is present than in the area where it is absent. Hence, should such potential distributions be developed with a bias for development shown in FIG. 7 selected, one dot would have a greater diameter in the area where the toner is present than in the area where it is absent, i.e., the reproducibility of a dot shape would be low. Specifically, to provide a dot with substantially the same shape in both the area where the toner is present and the area where it is absent, it is, in principle, necessary to provide a laser beam with a particular intensity and a particular diameter in each of the two areas. The requisite is, therefore, to see how a toner image formed on a photoconductive element effects the intensity and diameter of a laser beam, i.e., the scattering and interception characteristics of a laser beam due to a toner image.

How to deal with the scattering and interception of a laser beam due to a toner image has not been reported yet, either theoretically or experimentally.

The inventor studied the above-mentioned scattering and interception characteristics of a laser beam theoretically and experimentally and succeeded in evaluating the influence of a toner layer on the intensity and diameter of a laser beam transmitted through the toner layer in the quantitative aspect.

Figure 8C:
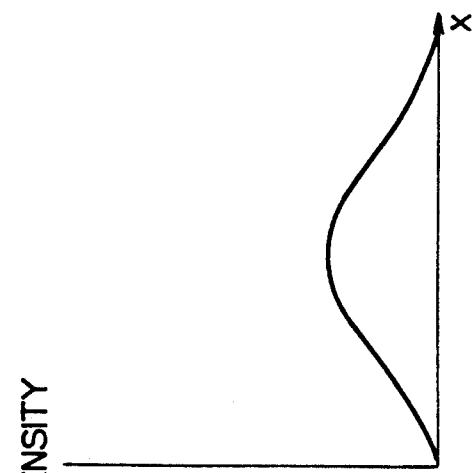
FIGS. 8A, 8B and 8C are graphs showing how the intensity and diameter of a laser beam are effected when the beam is transmitted through a toner layer.
Figure 8B:
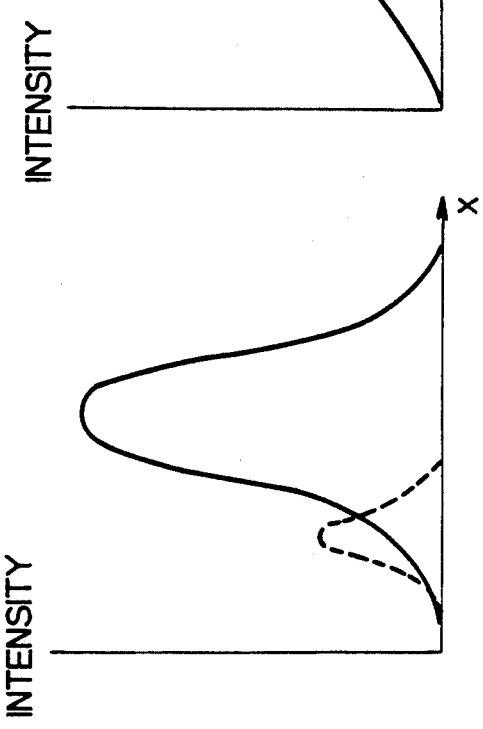
Figure 8A:
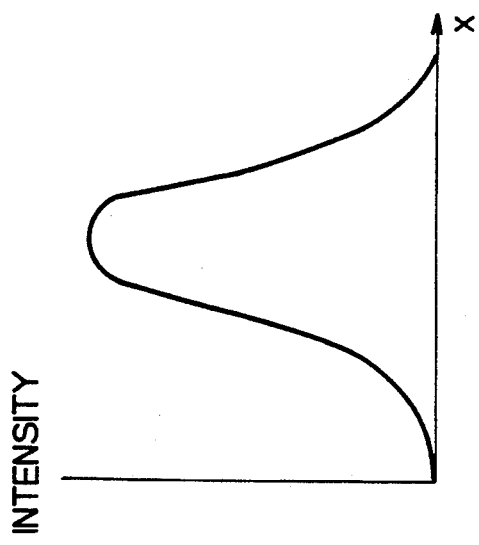

FIG. 8A shows the intensity distribution of a laser beam having a predetermined spot diameter, as measured on the surface of a photoconductive element. While the intensity distribution can be represented by a Gaussian distribution, as well known in the art, let it be represented by I(x,y) hereinafter. Here, x and y are the coordinates on a photoconductive element, and the center of a beam spot is the origin. Regarding the interception effect of a laser beam due to a toner layer existing on a photoconductive element, the toner layer is assumed to be a light absorbing layer having an absorption coefficient $\alpha$. Then, the intensity of a laser beam passed a toner layer having a thickness d is $\exp(-\alpha d)$ times the intensity before the passage. Assuming that the absorption effect of such a toner layer is A(d), then $A(d) = \exp(-\alpha d)$.

On the other hand, regarding the scattering effect of a laser beam due to a toner layer, assume that the scattering distribution by the toner layer whose thickness is d is S(x,y,d). Then, the scattering effect may be approximated by the Gaussian distribution, as follows:

$$S(x,y,d) = (2/\pi\sigma^2) \exp\{-2(x^2+y^2)/\sigma^2\}$$

where $\sigma$ denotes a scattering coefficient.

Since a toner layer is constituted by toner particles, the thickness d of the toner layer is a function of (x,y) in a microscopic sense. However, since the thickness d cannot be specified, assume that the the probability that the toner layer is d thick accords to the Poisson's distribution and is represented by P(d). Then, the scattering ability R(x,y) based on the absorption, scattering and thickness distribution ascribable to the toner layer is expressed as:

$$R(x,y) = \Sigma P(d) A(d) S(x,y,d)$$

Here, the sum of the right side of the above equation ranges from zero to infinite with respect to the parameter d. In FIG. 8B, a broken curve is representative of the scattering ability R(x,y).

The intensity It(x,y) of the laser beam passed the toner layer is produced by the "convolutional integration" of the laser beam intensity I(x,y) indicated by a solid line in FIG. 8B (before passage) and the scattering ability R(x,y) indicated by the broken line, as shown below:

$$It(x,y) = I(x,y) (\times) R(x,y)$$

where the symbol ($\times$) indicates a convolutional integration. This equation can be solved if the absorption coefficient $\alpha$ and scattering coefficient $\sigma$ of the toner layer and the intensity distribution I(x,y) of the beam spot are given. The inventor actually measured the absorption coefficient and scattering coefficient of a toner layer and found, by the above convolutional integration, that a laser beam diameter although it also had a Gaussian distribution, as shown in FIG. 8C.

To prove that the above theory on the interception and scattering characteristics, the inventor measured the intensity and diameter of a laser beam before and after the laser beam passed a toner layer by a method which is entirely new in the art. For the measurement, use was made of a magenta toner, a yellow toner and a cyan toner exhibiting, respectively, permeabilities of 90%, 89% and 65% to a 780 nm wavelength laser beam from an LD. First, the toners of different colors were deposited on a silver salt photographic paper which was sensitive to the infrared range. The regions of the photographic paper where the toners were present were exposed by a laser beam together with the other region where no toner existed. Subsequently, the toner layers were removed, and then the photographic paper was developed and fixed. The density distributions of the resulted silver salt images were read by a microdensity meter and then transformed to distributions of the amount of exposure on the basis of the gamma characteristic determined beforehand. By such a procedure, the intensities of the laser beam before and after the passage through the toner layers were obtained.

Figure 9A:
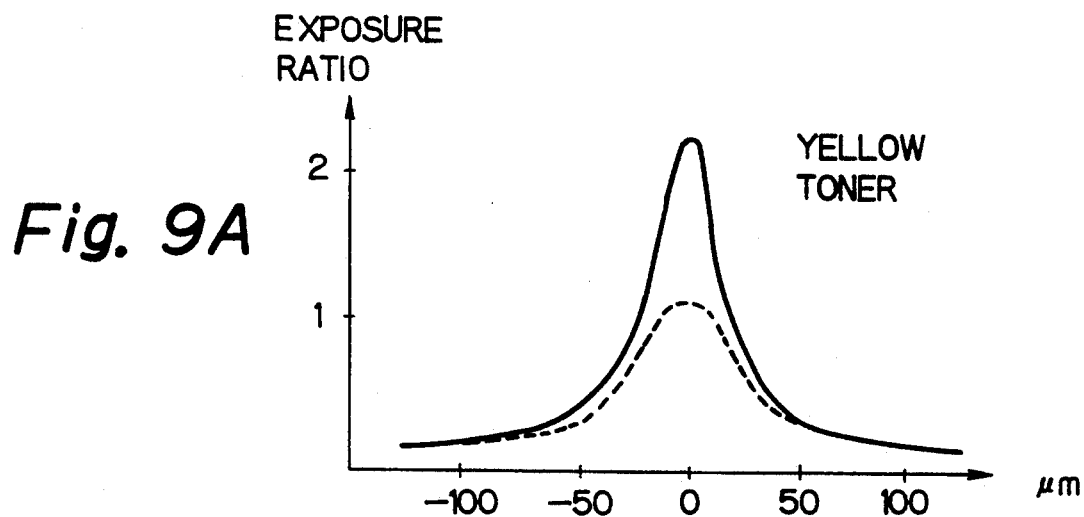
FIGS. 9A, 9B and 9C are graphs each showing light intensity distributions of a laser beam before and after the passage through a toner layer.
Figure 9B:
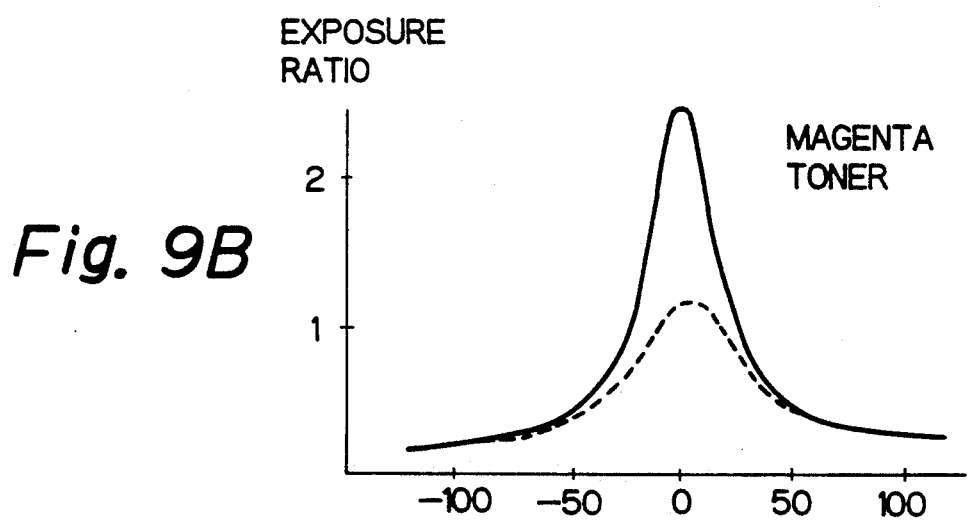
Figure 9C:
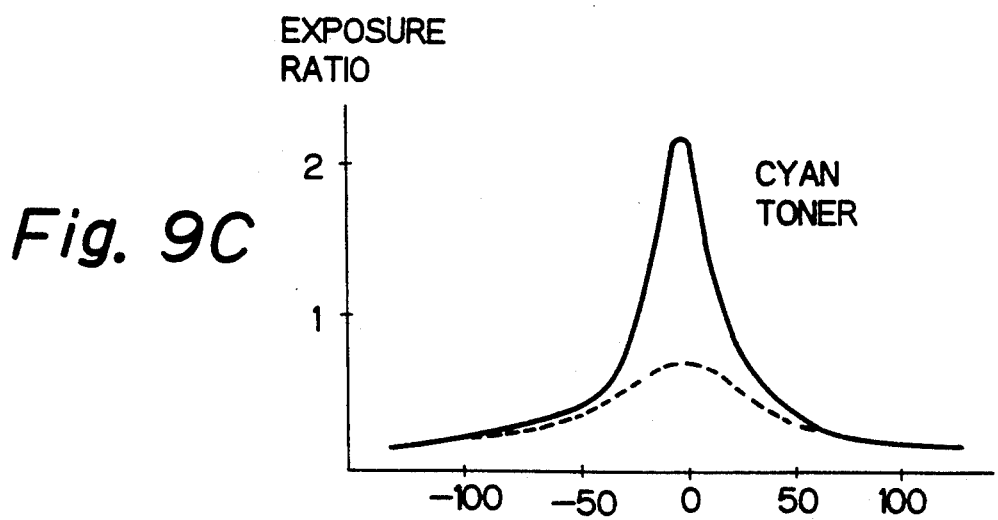

FIGS. 9A–9C show the results of the above measurement and correspond to the yellow toner, magenta toner, and cyan toner, respectively. In these figures, solid curves and broken curves represent, respectively, the intensity distributions before the passage through the toner layers and after the passage through the toner layers. As the figures indicate, the results of actual measurement satisfactorily coincide with the theoretically derived intensity distributions.

Figure 10A:
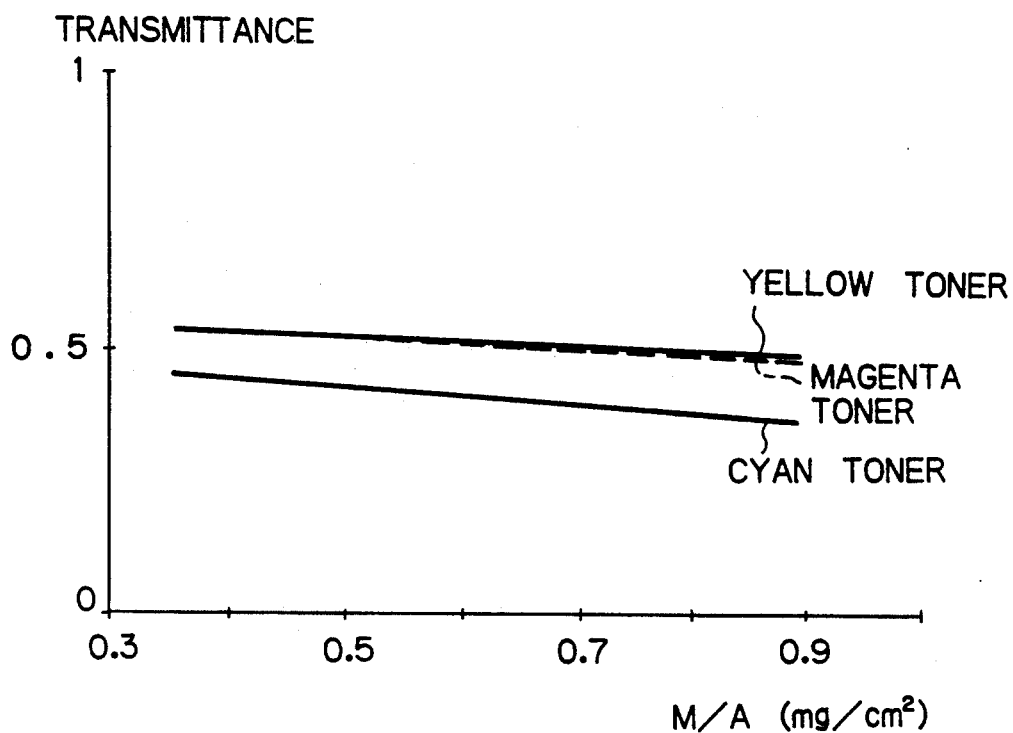
FIGS. 10A and 10B are graphs representative of the interception and scattering effects of a laser beam due to a toner layer.
Figure 10B:
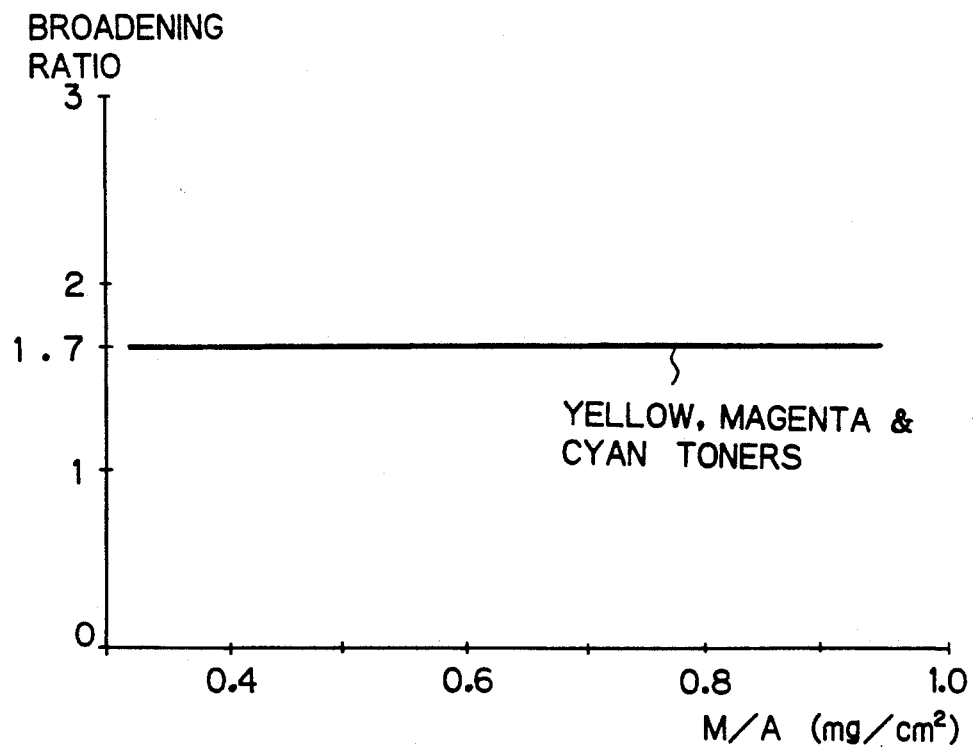

FIG. 10A indicates how the transmission ratio of a toner layer through a laser beam (i.e. a ratio of the peaks of a laser beam before and after the passage through a toner layer) changes with the amount of toner deposition M/A (mg/cm$^2$). While the transmission ratio, of course, substantially exponentially decreases with the increase in the amount of toner deposition, the amount of transmitted light may safely be considered to be one half in average. In FIG. 10A, the change in the amount of transmitted light is represented by a straight line since it corresponds to the skirt of the exponential function. Y, M and C in FIG. 10A indicate a yellow toner, a magenta toner, and a cyan toner, respectively. FIG. 10B shows the broadening ratio of the beam diameter after the passage through a toner layer, i.e., the ratio of the half widths of beam intensity distribution before and after the passage through a toner layer. As shown, the broadening ratio is constantly substantially 1.7 with no regard to the kind and the amount of deposition of a toner.

Based on the above findings, the present invention forms a multicolor image by using the interception and scattering characteristics which are determined specifically toner by toner.

The interception and scattering characteristics have been theoretically dealt with above on the assumption that only a single kind of toner forms a layer on a photoconductive element. When toners of different kinds form a single toner layer on a photoconductive element, all that is required is to combine the scattering abilities ascribable to the individual toners with the above-described result by convolutional integration. For example, assuming that a magenta toner, a yellow toner, a cyan toner and a black toner form a toner layer, the scattering abilities R(x,y: magenta), R(x,y: yellow), R(x,y: cyan) and R(x,y: black) ascribable to the individual toners are determined, and then the right side of the following convolutional integration is calculated:

$$I_t(x,y) = I(x,y) (\times) R(x,y: \text{magenta}) (\times)$$
$$R(x,y: \text{yellow}) (\times) R(x,y: \text{cyan}) (\times)$$
$$R(x,y: \text{black})$$

The above description concentrates on a condition wherein a laser beam is incident on a predetermined position of a photoconductive element statically. In practical scanning, it is necessary to compensate for the influence of the skirt portion of the light distribution of one or two adjoining dots. However, this is not relevant to the crux of the present invention and will not be described specifically.

Preferred embodiments of the multicolor forming method and apparatus in according with the present invention will be described hereinafter.

Figure 1:
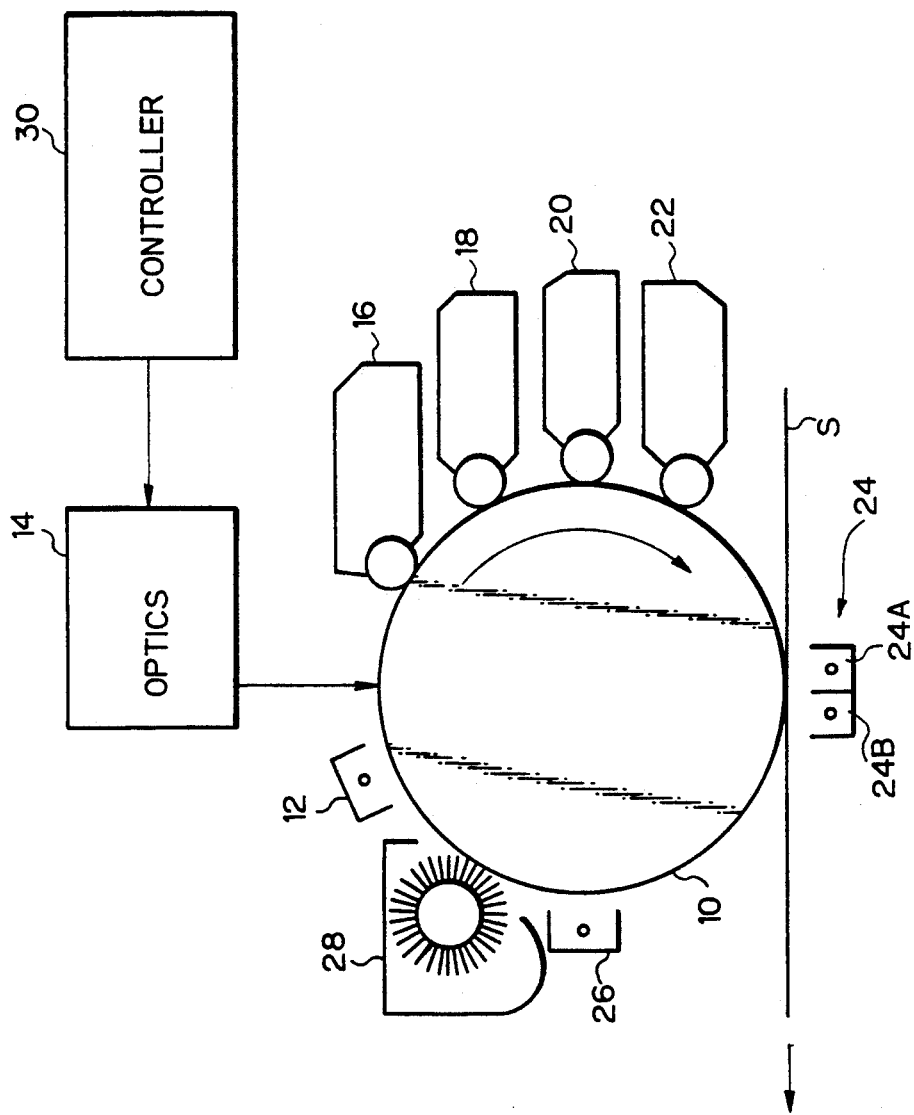
FIG. 1 is a fragmentary section showing a specific construction of a multicolor image forming apparatus with which the present invention is practicable.

Referring to FIG. 1, a specific construction of an apparatus with which the present invention is practicable is shown. As shown, the apparatus includes a photoconductive element in the form of a drum 10. The drum 10 is rotatable in a direction indicated by an arrow in the figure. While the drum 10 is in rotation, a scorotron charger 12 uniformly charges the surface of the drum 10. Then, optics 14 optically scans the charged surface of the belt 10 to form an electrostatic latent image to be developed by a yellow toner. A developing unit 16 develops the latent image by a yellow toner. This is the first image forming step. Such an image forming step is repeated with each of the other toners. Specifically, after the yellow toner image has been formed, the scorotron charger 12 again uniformly charges the surface of the drum 10 being rotated. Subsequently, the optics forms an electrostatic latent image on the drum 10. At this instant, optical scanning is, of course, effected over the yellow toner image. The latent image is developed by a developing unit 18 storing a magenta toner. Similar latent images are sequentially developed one above another by developing units 20 and 22 storing a cyan toner and a black toner, respectively. As a result, a desired multicolor image completed on the drum 10.

The multicolor image is transferred to a paper sheet or similar recording medium S being transported in a direction indicated by an arrow in the figure. Specifically, after a transfer charge 24A forming part of a transfer and separation charger 24 has transferred the multicolor image to the paper sheet S, a separation charger 24B forming the other part of the charger 24 separates the paper sheet S from the drum 10. The paper sheet S separated from the drum 10 has the multicolor image thereof fixed by a fixing unit, not shown, and then driven out of the apparatus. The charge remaining on the drum 10 after the image transfer is removed by a discharger 26 while the toners remaining on the drum 10 are removed by a cleaner 28.

Figure 2:
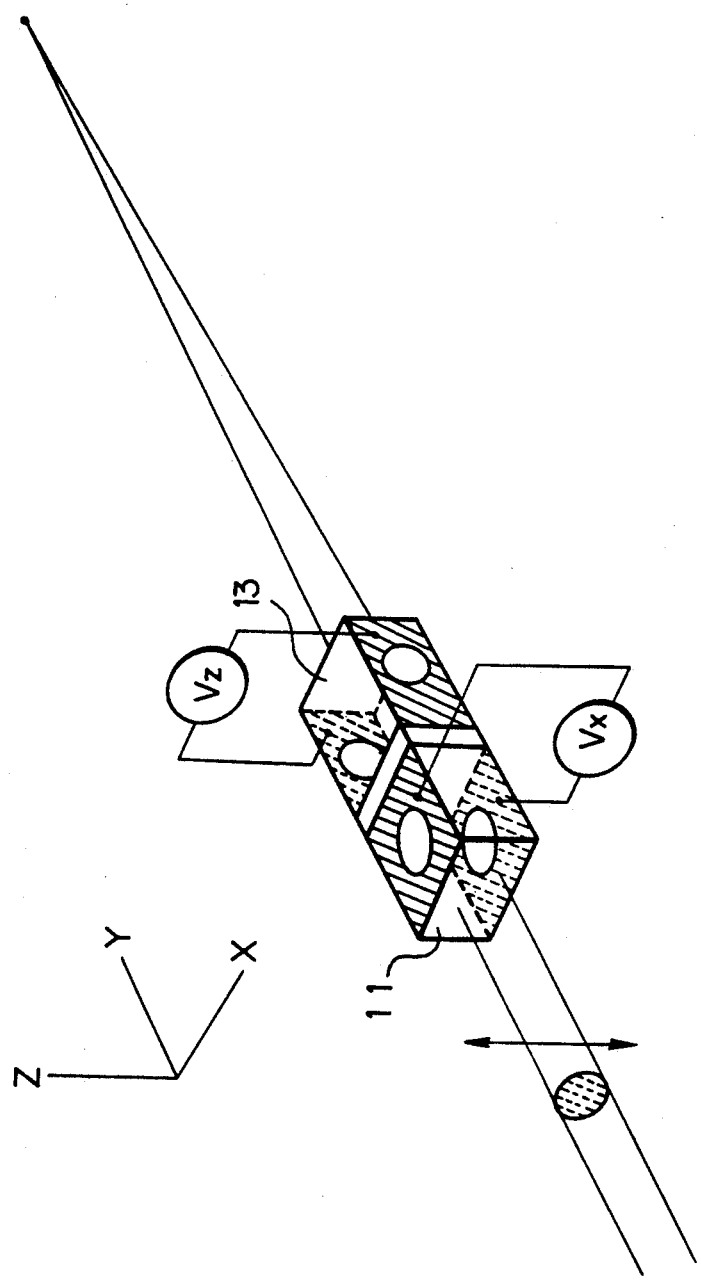
FIG. 2 is a perspective view showing a specific construction of beam diameter changing means included in a first embodiment of the present invention.

First, referring to FIG. 2, there is shown a variable-focus optical device for changing the convergence of a laser beam. As shown, the optical device has a PLZT rectangular parallelepiped 11 provided with an electrode film on a pair of surfaces thereof which are perpendicular to a direction Z, and a PLZT rectangular parallelepiped 13 provided with an electrode film on a pair of surfaces thereof perpendicular to a direction X. The rectangular parallelepipeds 11 and 13 are located side by side in a direction Y. A parallel laser beam deflected in the direction Z is transmitted through the rectangular parallelepipeds 11 and 13 in the direction Y. The electrode films formed on the rectangular parallelepipeds 11 and 13 each has the central part thereof removed in a circular shape. When a voltage is applied to between the electrode films which face each other, part of the films effected by an electric field lowers the refractive index of PLZT due to an electrooptical effect. As a result, a cylindrical portion having a great refractive index is defined in the PLZT parallelepiped and serves as a cylinder lens having positive power. Specifically, when a voltage Vx is applied to the rectangular parallelepiped 11, the parallelepiped 11 serves as a cylinder lens having positive power in the direction X. When a voltage Vz is applied to the rectangular parallelepiped 13, the parallelepiped 13 serves as a cylinder lens having positive power in the direction Z. Hence, the parallel laser beam will converge to a single point in the voltages Vx and Vt are provided with a certain relation. Further, the converging position of the parallel beam will be changed in the Y direction if the voltages Vx and Vz are adjusted while maintaining the above relation. A first embodiment of the present invention which will be described uses the optical device shown in FIG. 2 as beam diameter changing means. Alternatively, the beam diameter changing means may be implemented as, for example, a stop mechanism which controls the diameter of the laser beam.

Figure 3:
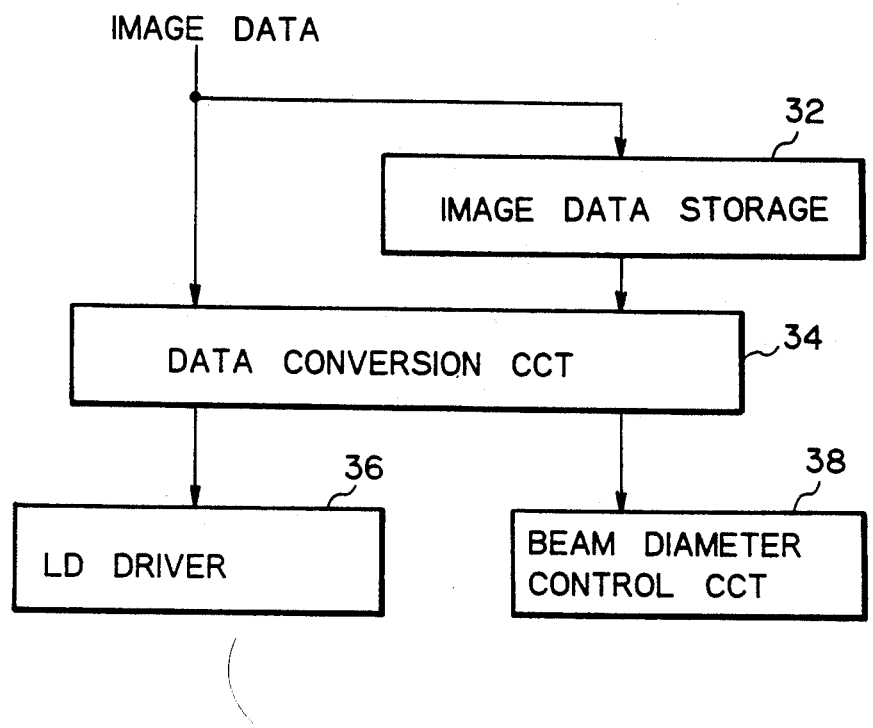
FIG. 3 is a block diagram schematically showing a controller included in the embodiment.

In the first embodiment, the optics 14, FIG. 1, is provided with the variable-focus optical device of FIG. 2 and controlled by a controller 30 together with an LD. FIG. 3 shows the construction of the controller 30 specifically. As shown, the controller 30 has an image data storage 32 and a data conversion circuit 34 to both of which image data are applied. Yellow, magenta, cyan and black images are sequentially formed in this order to complete a multicolor image, as stated earlier. In this sense, image data sequentially applied to the controller 30 will be referred to as yellow image data, magenta image data, cyan image data, and black image data hereinafter. On receiving yellow image data, the data conversion circuit 34 simply transfers them to an LD driver 36 since no toner image exits on the drum 10 at this stage of operation. At this instant, the emission intensity of the LD and the beam diameter of the laser beam are set at respective reference values. Specifically, the data conversion circuit 34 generates signals for setting up such reference values. Then, the LD driver 34 modulates the emission intensity of the LD while maintaining the intensity on the ON state of the LD at the reference intensity. At the same time, a beam diameter control circuit 38 controls the beam diameter to the reference diameter by the variable-focus optical device shown in FIG. 2. The yellow image data are written into the image data storage 32.

After a latent image electrostatically formed on the basis of the yellow image data has been developed by the yellow toner, the second image forming step begins. Magenta image data are applied to and stored in the image data storage 32 together with the existing yellow image data and, at the same time, applied to the data conversion circuit 34. At this instant, the yellow image data are fed from the image data storage 32 to the data conversion circuit 34. The data conversion circuit 34 compare the incoming magenta image data and the yellow image data pixel by pixel in the optical scanning order. In portions where the yellow image data is absent, i.e., where the yellow toner image is absent on the drum 10, the data conversion circuit 34 delivers commands to the LD driver 36 and beam diameter control circuit 38 such that both the emission intensity and the beam diameter of the LD are maintained in their reference values. On the other hand, in portions where the yellow image data is present, the data conversion circuit 34 causes the LD driver 36 to substantially double the emission intensity and causes the beam diameter control circuit 38 to reduce the beam diameter to substantially 1/1.7 of the reference value. The resulting electrostatic latent image is developed by the magenta toner. The third and fourth image forming steps are sequentially executed in the same manner. A multicolor image completed on the drum 10 by such an iterative step is transferred to a paper sheet and then fixed. Of course, doubling the emission intensity and reducing the beam diameter to 1/1.7 is applicable to the toners used herein and will, of course, be changed depending on the kinds of toners to be used.

In the above description, the image data is assumed to have two levels. By changing the diameter of the laser beam incident on a photoconductive element, it is possible to change the size of a dot and, therefore, to render tonality in a dot image, as has been customary in the art. When this principle is applied to the above embodiment, the image data storage 32 will be constructed to store not only the presence/absence of dot but also the size of dot, i.e., tone data. Then, the data conversion circuit 34 will compare input image data and the data fed from the storage 32 to select a particular emission intensity and a particular beam diameter. For this purpose, the data conversion circuit 34 may store a table listing predetermined emission intensities and beam diameters matching the combinations of the presence/absence of dot and tonality to be fed from the storage 32.

A second embodiment of the present invention will be described which does not use the beam diameter changing means and, instead, causes a data conversion circuit to determine an emission intensity and an emission pulse width of an LD.

FIGS. 11A and 11B each shows a graph indicating the surface potential of a photoconductive element on the ordinate and the position of the surface of the element on the abscissa. The surface potential on the ordinate is shown on a 10 V basis. The graphs of FIGS. 11A and 11B are associated with the main scanning direction and the subscanning direction, respectively. Specifically, FIG. 11A shows the variation of the potential distribution of one dot observed when the power of an LD was 0.7 mW and the duty ratio of pulse emission was changed over a range of 5% to 50% on a 5% basis. As FIG. 11A indicates, the depth and width of the potential distribution increases with the increase in duty ratio. FIG. 11B shows the variation of the potential distribution of one dot determined when the duty ratio of the pulse width of an LD was 50% and the power was changed over a range of 0.1 mW to 1.0 mW on a 0.1 mW basis; the depth and width of the potential distribution increases with the increase in power, i.e., emission intensity. Hence, the beam intensity and the beam diameter cannot be dealt with independently of each other since the depth and width of the potential distribution of one dot changes when any of the emission intensity and pulse width is changed. However, if the emission intensity and pulse width of an LD are determined, the width and depth of the potential distribution of one dot will be unconditionally determined. In the light of this, when image data has two levels, an emission intensity and a pulse width giving, respectively, a beam intensity and a beam diameter in the condition wherein a toner image is absent on a photoconductive element are set as reference values. Then, emission intensities and pulse widths which allow one dot formed by scanning the individual toner images to have substantially the same size as in the case without a toner image are listed in a table. This allows the beam intensity and beam diameter to be determined with reference to the table.

Figure 4:
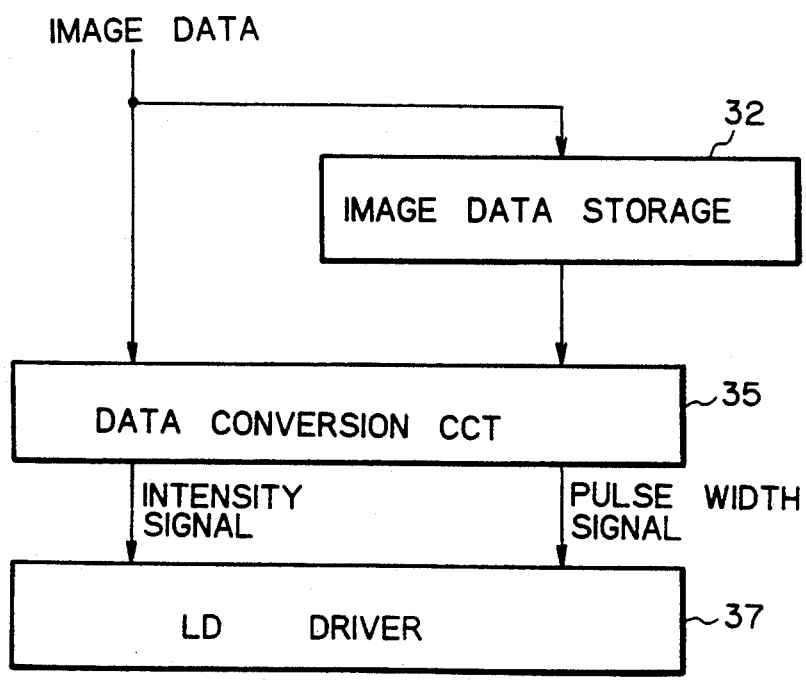
FIG. 4 is a block diagram schematically showing a controller representative of a second embodiment of the present invention.

FIG. 4 shows a specific construction of the controller 30, FIG. 1, for implementing the second embodiment. As shown, the controller 30 also has the image data storage 32 and data conversion circuit 35. While the image data storage 32 is identical with the storage 32 shown in FIG. 3, the data conversion circuit 35 of FIG. 4 determines an emission intensity and a pulse width of the LD in response to input color image data and data fed from the storage 32 and delivers an emission intensity signal and a pulse width signal to an LD driver 37. On receiving such signals, the LD driver 37 selectively turns on or turns off the LD with the emission intensity and pulse width indicated by the signals. In this connection, assume that a dot to be formed has a size of $70 \times 80$ ($\mu$m), and that the LD is driven by a power, or emission intensity, of 0.7 mW and a pulse width of 50% when it scans a photoconductive element on which a toner image is absent. Then, to scan the photoconductive element through a yellow toner image (deposited in an amount of 0.72 mg/cm$^2$), the power and the pulse width may be 1 mW and 81%, respectively.

Figure 5:
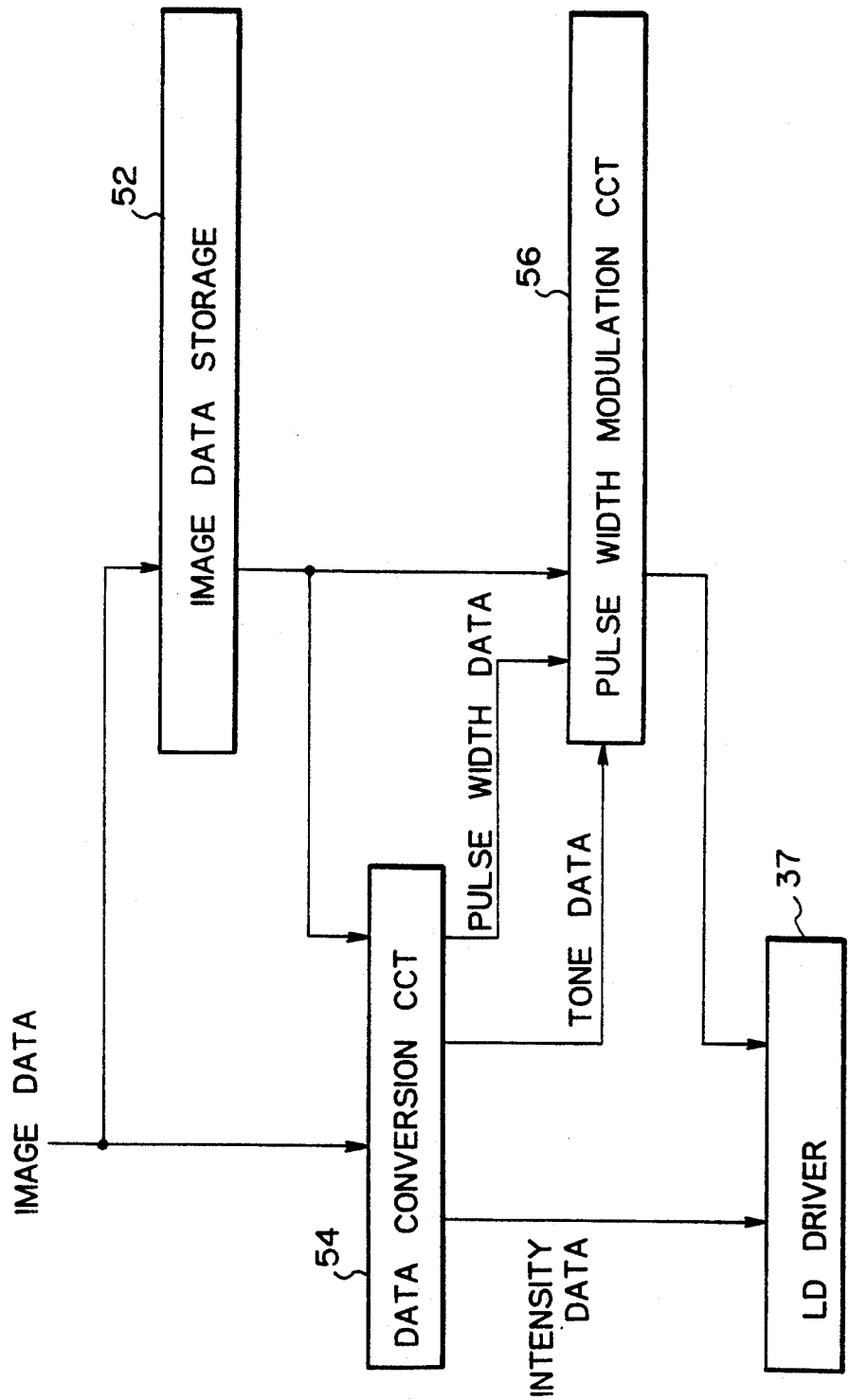
FIG. 5 is a schematic block diagram showing a controller representative of a third embodiment of the present invention.

When the image data has multiple levels, the emission intensity and pulse width of the LD may be determined on the basis of the presence/absence of dot, the presence/absence of toner image in a portion where a dot should be entered, and the tonality of dot. A third embodiment which will be described is applicable to such a case and is represented by the controller 30 shown in FIG. 5. The controller 30 of FIG. 5 has an image data storage 52 and a data conversion circuit 54. Image data applied to the controller 30 is fed to the data conversion circuit 54 while being stored in the image data storage 52. At the same time, data associated with a toner image or toner images previously formed on the drum 10, FIG. 1, are fed from the image data storage 52 to the data conversion circuit 54 and a pulse width modulation circuit 56. By comparing the input image data and the stored data, the data conversion circuit 54 determines emission intensity data, pulse width data, and tone data (tone data of input image data). The emission intensity data is fed to the LD driver 37 while the pulse width data and tone data are fed to the pulse width modulation circuit 56. The pulse width modulation circuit 56 determines a pulse width matching the pulse width data from the data conversion circuit 54 and the tone data and delivers it to the LD driver 37. The LD driver 37 selectively turns on or turns off the LD in response to the emission intensity data and pulse width signal. As a result, a multicolor image with tonality is formed on the drum 10.

FIG. 6 lists specific combinations of emission intensity (power: 0.7 mW) and pulse width usable to form dots of various sizes in the bare area of a photoconductive element where a toner image is absent, and specific combinations of emission intensity (power: 1.0 mW) and pulse width usable when a yellow toner image is deposited on the element in an amount of 0.72 mg/cm$^2$.

In summary, it will be seen that the present invention provides an entirely new and useful method of forming a multicolor image and an apparatus therefor. In accordance with the invention, a dot has substantially the same shape in both the area of a photoconductive element where a toner image is present and the area where a toner image is absent. Hence, a desirable multicolor image with high dot reproducibility is achievable.

Various modifications will become possible for those skilled in the art after receiving the teachings of the present disclosure without departing from the scope thereof.

What is claimed is:

1. In a method of forming a multicolor image on a recording medium by repeating a sequence of steps of uniformly charging a photoconductive element, scanning said photoconductive element by a laser beam to form an electrostatic latent image on said photoconductive element, and developing the latent image by reversal with each of a plurality of toners of different colors to thereby produce a multicolor toner image on said photoconductive element, and transferring the multicolor toner image to and fixing the multicolor toner image on a recording medium, an intensity of the laser beam is controlled together with a beam diameter or an emission pulse width in the event of the second and successive sequences of steps included in a single multicolor image forming process such that, when the laser beam scans part of said photoconductive element where a toner image formed by the preceding sequence of steps is present, the laser beam forms a dot of substantially the same size in both the part where a toner image is present and part where a toner image is absent, in matching relation to an interception and scattering characteristics of the laser beam due to the toner image.

2. An apparatus for forming a multicolor image on a recording medium by repeating a sequence of steps of uniformly charging a photoconductive element, scanning said photoconductive element by a laser beam from a laser diode (LD) to form an electrostatic latent image on said photoconductive element, and developing the latent image by reversal with each of a plurality of toners of different colors to thereby produce a multicolor toner image on said photoconductive element, and transferring the multicolor toner image to and fixing the multicolor toner image on a recording medium, said apparatus comprising:

image data storing means for storing image data representative of the toner images of different colors formed on the photoconductive element;

data converting means for determining, on receiving image data, an intensity and a beam diameter of the laser beam on the basis of contents of said image data storing means;

LD driving means for driving the LD in response to an output of said data converting means; and beam diameter changing means for changing the diameter of the laser beam in response to an output of said data converting means;

said data converting means determining, in the event of the second and successive sequences of steps included in a single multicolor image forming process, an emission intensity and a beam diameter of the LD such that, when the laser beam scans part of the photoconductive element where a toner image formed by the preceding sequence of steps is present, the laser beam forms a dot of substantially the same size in both the part where a toner image is present and part where a toner image is absent, in matching relation to an interception and scattering characteristics of the laser beam due to the toner image.

3. An apparatus for forming a multicolor image on a recording medium by repeating a sequence of steps of uniformly charging a photoconductive element, scanning said photoconductive element by a laser beam from a laser diode (LD) to form an electrostatic latent image on said photoconductive element, and developing the latent image by reversal with each of a plurality of toners of different colors to thereby produce a multicolor toner image on said photoconductive element, and transferring the multicolor toner image to and fixing the multicolor toner image on a recording medium, said apparatus comprising:

image data storing means for storing image data representative of the toner images of different colors formed on the photoconductive element;

data converting means for determining, on receiving image data, an intensity and an emission pulse width of the laser beam on the basis of contents of said image data storing means; and LD driving means for driving the LD in response to an output of said data converting means;

said data converting means determining, in the event of the second and successive sequences of steps included in a single multicolor image forming process, an emission intensity and an emission pulse width of the LD such that, when the laser beam scans part of the photoconductive element where a toner image formed by the preceding sequence of steps is present, the laser beam forms a dot of substantially the same size in both the part where a toner image is present and part where a toner image is absent, in matching relation to an interception and scattering characteristics of the laser beam due to the toner image.

4. An apparatus as claimed in claim 3, wherein the image data are multilevel data representative of tonality, said apparatus further comprising pulse width modulating means for modulating the emission pulse width such that a dot having substantially the same shape is formed in both the part where a toner image is present and the part where a toner image is absent.

* * * * *